(12) United States Patent
Xie et al.

(10) Patent No.: US 12,339,843 B2
(45) Date of Patent: Jun. 24, 2025

(54) APPARATUS, METHOD AND STORAGE MEDIUM FOR DATABASE PAGINATION

(71) Applicant: Starlord (Cayman) Limited, Grand Cayman (KY)

(72) Inventors: Chao Xie, San Francisco, CA (US); Xuan Yang, Shanghai (CN); Xiaofan Luan, Shanghai (CN); Enwei Jiao, Shanghai (CN)

(73) Assignee: Starlord (Cayman) Limited, Grand Cayman (KY)

( * ) Notice: Subject to any disclaimer, the term of this patent is extended or adjusted under 35 U.S.C. 154(b) by 151 days.

(21) Appl. No.: 18/057,575

(22) Filed: Nov. 21, 2022

(65) Prior Publication Data

US 2024/0078234 A1    Mar. 7, 2024

Related U.S. Application Data

(60) Provisional application No. 63/403,572, filed on Sep. 2, 2022.

(51) Int. Cl.
*G06F 16/2453* (2019.01)
(52) U.S. Cl.
CPC .. *G06F 16/24542* (2019.01); *G06F 16/24539* (2019.01)
(58) Field of Classification Search
None
See application file for complete search history.

(56) References Cited

U.S. PATENT DOCUMENTS

| | | | |
|---|---|---|---|
| 2012/0117509 A1* | 5/2012 | Powell | G06F 16/24575 707/E17.045 |
| 2012/0158766 A1* | 6/2012 | Chuang | G06F 16/2428 707/E17.014 |
| 2017/0118738 A1* | 4/2017 | Axmon | H04W 4/14 |
| 2021/0266220 A1* | 8/2021 | A | H04L 41/0806 |
| 2021/0334316 A1* | 10/2021 | George | G06F 16/24568 |
| 2022/0197933 A1* | 6/2022 | Boxwell | G06F 16/9538 |
| 2022/0398237 A1* | 12/2022 | Sonawane | G06F 16/2445 |

FOREIGN PATENT DOCUMENTS

| | | |
|---|---|---|
| CN | 112445833 A | 3/2021 |
| CN | 112612827 A | 4/2021 |

\* cited by examiner

*Primary Examiner* — Christopher J Raab
(74) *Attorney, Agent, or Firm* — Kim IP Law Group LLC

(57) ABSTRACT

An apparatus, a method, and a storage medium for database pagination. The apparatus, method, and storage medium are configured to perform following processes, including: acquiring a pagination request from a user; determining a query parameter based on the pagination request; determining a corresponding pagination pattern and a request data amount based on the query parameter; determining a target query mode based on the request data amount; generating a query task based on the pagination pattern and the target query mode; obtaining at least one first query result based on the query task; determining a target result set based on the at least one first query result; and paging the target result set based on the pagination pattern and the target query mode to obtain multiple pages of pagination data.

17 Claims, 7 Drawing Sheets

APPARATUS, METHOD AND STORAGE MEDIUM FOR DATABASE PAGINATION

RELATED APPLICATIONS

The present application claims the benefit of U.S. Provisional Patent Application No. 63/403,572 filed on Sep. 2, 2022, entitled "Method for Pagination of Search Results of Vector Database," the entire disclosure of which is hereby incorporated herein by reference.

TECHNICAL FIELD

The disclosure relates in general to the field of computers, and more particularly, to an apparatus, method, and storage medium for database pagination.

BACKGROUND

Existing database paging or pagination has two implementations: Offset+Limit and seek, both of which depend on the ordered query results. Offset+Limit means that for the query results that have been sorted, the previous Offset results are skipped and limit results are taken as returns.

Seek means that the last value of the previous query is selected as the filtering point, and the content returned by the previous query is filtered out at the next query. For example, if the first query fetches the first 10 data items and sorts them by ID, and the ID of the tenth data item is 1001, then the next query can skip some data with a WHERE ID>1001 condition.

These two paging implementations are other database options, both of which are not suitable for vector databases, and the reason for the non-applicability relates to core storage.

An RDBMS (Relational Database Management System) bottom layer stores data using the B+ tree, and many columns used for sorting in the RDBMS can be indexed. This storage structure easily skips a large amount of data at the time of a query and searches back from the middle. In addition to obtaining scalar data like an RDBMS, the vector database may have vector calculations. The scalar data is a one-dimensional vector, and the vectors are multi-dimensional vectors, such as two-dimensional vectors and three-dimensional vectors. In some vector databases, however, the vector calculation is performed in units of Segment in Milvus, and the output results are sorted in distance in a fixed sorting manner. The distance data used for sorting can only be obtained by calculating the vector data in the database, which restricts the implementation of pagination.

A query without vector calculations may be included in the vector database. Since the data storage is designed and optimized for vector calculations, all scalar data is only ordered inside the file, and the files are out-of-order with no separate index. Therefore, it is difficult to skip a series of data at the level of the rows of the database to reduce the amount of calculations in the query process.

In order to accelerate the vector calculation, the scalar data, the original vector, or the indexes can be pre-loaded into memory, so that the memory resources of the database are very tight. In addition, paging queries are large data-level queries, the database should pay attention to the use of memory when performing paging queries.

SUMMARY

The following examples pertain to embodiments described throughout this disclosure.

One or more embodiments can include an apparatus. The apparatus includes a memory for storing database data and a processor. The processor is configured to perform following processes, including: acquiring a pagination request from a user; determining a query parameter based on the pagination request; determining a corresponding pagination pattern and a request data amount based on the query parameter; determining a target query mode based on the request data amount; generating a query task based on the pagination pattern and the target query mode; obtaining at least one first query result based on the query task; determining a target result set based on the at least one first query result; and paging the target result set based on the pagination pattern and the target query mode to obtain multiple pages of pagination data.

One or more embodiments can include an apparatus, wherein the target query mode comprises a first query mode and a second query mode; and determining the target query pattern based on the request data amount comprises: when the amount of requested data is less than or equal to a preset threshold, the first query mode is set as the target query mode, wherein the first query mode is used to indicate an immediate pagination, and when the amount of requested data is greater than a preset threshold, the second query mode is set as the target query mode, wherein the second query mode is used to indicate a pagination of bulk data.

One or more embodiments can include an apparatus, wherein generating the query task based on the pagination pattern and a target query mode, comprises: determining the first query mode; selecting a target paging parameter and a target sorting parameter based on the pagination pattern and the first query mode; loading database data based on the target paging parameter and the target sorting parameter; determining the database data that was loaded; and generating a query task according to the target paging parameter and the target sorting parameter.

One or more embodiments can include an apparatus, wherein obtaining at least one first query result based on a query task, comprises: determining a second level query task based on the first level query task, wherein the first level query task runs on a first level node and the second level query task runs on a second level node; determining a third level query task based on the second level query task, wherein the third level query task runs on a third level node, and the third level node including a segment node; and executing the third level query task to obtain the at least one first query result.

One or more embodiments can include an apparatus, wherein determining the target result set based on the at least one first query result, comprises: performing a first aggregation process on the at least one first query result to obtain at least one second query result, wherein the first aggregation process runs on the second level node; and performing a second aggregation process on the at least one second query result to obtain a target result set, wherein the second aggregation process runs on the first level node.

One or more embodiments can include an apparatus, wherein paging the target result set based on the pagination pattern and the target query mode to obtain multiple pages of pagination data, comprises: paging the target result set based on the pagination pattern and the first query mode to obtain multiple pages of pagination data.

One or more embodiments can include an apparatus, wherein paging the target result set based on the pagination pattern and the first query mode comprises one or more of: determining that the pagination pattern is SEARCH pattern, discarding the data with the number of offset value arranged in the front of the target result set and taking the data in number of limit value pieces in the remaining data; determining that the pagination pattern is RANGESEARCH pattern, discarding the data with the number of offset value arranged in the front of the target result set, and taking the data in number of limit value pieces in the remaining data, wherein the target result set is obtained by aggregating the first query results sorted according to distance; determining that the pagination pattern is QUERY pattern, discarding the data with the number of offset value arranged in the front of the target result set, and taking the data in number of limit value pieces in the remaining data, wherein the target result set is obtained by aggregating the first query results ordered by rowID or the primary key; and determining that the pagination pattern is QUERY pattern, determining a target cursor from a preset cursor set, and paging the target result set according to the target cursor.

One or more embodiments can include an apparatus, wherein generating a query task based on the pagination pattern and a target query mode, comprises determining the second query mode, and then generating a query task based on the pagination pattern and the second query mode.

One or more embodiments can include an apparatus, wherein the first query result comprises a segment query result set and obtaining at least one first query result based on a query task, comprises: determining a second level query task based on the first level query task, wherein the first level query task runs on a first level node and the second level query task runs on a second level node; determining a third level query task based on the second level query task, wherein the third level query task runs on a third level node, the third level node including a segment node; and executing the third level query task to obtain a segment query result set corresponding to each segment.

One or more embodiments can include an apparatus, wherein determining a target result set based on the at least one first query result, comprises: caching the segment query result set as the target result set in the designated storage location based on the corresponding segment of each segment, wherein the designated storage location includes S3 caching.

One or more embodiments can include an apparatus, wherein paging a target result set based on the pagination pattern and the target query mode to obtain multiple pages of pagination data, comprises: establishing a segment list based on a segment query result set corresponding to each segment; determining an accessed target segment from the segment list according to the pagination pattern; using a segment query result set corresponding to the target segment as the target page query data; storing the target page query data and a target cursor which is corresponding to the next page query data; and determining accessed next page query data based on the target cursor.

One or more embodiments can include a method performed by at least one processor. The method includes acquiring a pagination request from a user; determining a query parameter based on the pagination request; determining a corresponding pagination pattern and a request data amount based on the query parameter; determining a target query mode based on the request data amount; generating a query task based on the pagination pattern and the target query mode, and obtaining at least one first query result based on the query task; determining a target result set based on the at least one first query result; and paging the target result set based on the pagination pattern and the target query mode to obtain multiple pages of pagination data.

One or more embodiments can include a computer-readable storage medium having stored thereon instructions that, when executed on an electronic device, cause the electronic device to perform a method. The method includes acquiring a pagination request from a user; determining a query parameter based on the pagination request; determining a corresponding pagination pattern and a request data amount based on the query parameter; determining a target query mode based on the request data amount; generating a query task based on the pagination pattern and the target query mode, and obtaining at least one first query result based on the query task; determining a target result set based on the at least one first query result; and paging the target result set based on the pagination pattern and the target query mode to obtain multiple pages of pagination data.

One or more embodiments can include a computer-readable storage medium, wherein the target query mode comprises a first query mode and a second query mode and determining a target query pattern based on the request data amount, comprises: when the amount of requested data is less than or equal to a preset threshold, the first query mode is set as the target query mode, wherein the first query mode is used to indicate an immediate pagination; and when the amount of requested data is greater than a preset threshold, the second query mode is set as the target query mode, wherein the second query mode is used to indicate a pagination of bulk data.

One or more embodiments can include a computer-readable storage medium, wherein generating a query task based on the pagination pattern and a target query mode, comprises: determining a first query mode; selecting a target paging parameter and a target sorting parameter based on the pagination pattern and the first query mode; loading database data based on the target paging parameter and the target sorting parameter; determining the loaded database data; and generating a query task according to the target paging parameter and the target sorting parameter.

One or more embodiments can include a computer-readable storage medium, wherein obtaining at least one first query result based on a query task, comprises: determining a second level query task based on the first level query task, wherein the first level query task runs on a first level node and the second level query task runs on a second level node; determining a third level query task based on the second level query task, wherein the third level query task runs on a third level node, and the third level node including a segment node; and executing the third level query task to obtain at least one first query result.

One or more embodiments can include a computer-readable storage medium, wherein determining a target result set based on the at least one first query result, comprises: performing a first aggregation process on the at least one first query result to obtain at least one second query result, wherein the first aggregation process runs on the second level node; and performing a second aggregation process on the at least one second query result to obtain a target result set, wherein the second aggregation process runs on the first level node.

One or more embodiments can include a computer-readable storage medium, wherein paging the target result set based on the pagination pattern and the target query mode to obtain multiple pages of pagination data comprises one or more of: determining the first query mode, determining that the pagination pattern is SEARCH pattern, discarding the data with the number of offset value arranged in the front of the target result set and taking the data in number of limit value pieces in the remaining data; determining the first query mode, determining that the pagination pattern is RANGESEARCH pattern, discarding the data with the number of offset value arranged in the front of the target result set, and taking the data in number of limit value pieces in the remaining data, wherein the target result set is obtained by aggregating the first query results sorted according to distance; determining the first query mode, determining that the pagination pattern is QUERY pattern, discarding the data with the number of offset value arranged in the front of the target result set, and taking the data in number of limit value pieces in the remaining data, wherein the target result set is obtained by aggregating the first query results ordered by rowID or the primary key; and determining the first query mode, determining that the pagination pattern is QUERY pattern, determining a target cursor from a preset cursor set, and paging the target result set according to the target cursor.

One or more embodiments can include a computer-readable storage medium, wherein the first query result comprises a segment query result set and obtaining at least one first query result based on a query task, comprises: determining the second query mode; determining a second level query task based on the first level query task, wherein the first level query task runs on a first level node and the second level query task runs on a second level node; determining a third level query task based on the second level query task, wherein the third level query task runs on a third level node, the third level node including a segment node; and executing the third level query task to obtain a segment query result set corresponding to each segment.

One or more embodiments can include a computer-readable storage medium, wherein determining a target result set based on the at least one first query result, paging the target result set based on the pagination pattern and the target query mode, to obtain multiple pages of pagination data, comprises: caching the segment query result set as the target result set in the designated storage location based on the corresponding segment of each segment, wherein the specified storage location includes S3 caching; establishing a segment list based on a segment query result set corresponding to each segment; determining an accessed target segment from the segment list according to the pagination pattern; using a segment query result set corresponding to the target segment as the target page query data, and storing the target page query data and a target cursor which is corresponding to the next page query data; and determining accessed next page query data based on the target cursor.

BRIEF DESCRIPTION OF THE FIGURES

The foregoing summary, as well as the following detailed description of the exemplary embodiments, will be better understood when read in conjunction with the appended drawings. For the purpose of illustrating the present disclosure, there are shown in the drawings embodiments, which are presently preferred. It will be understood, however, that the present disclosure is not limited to the precise arrangements and instrumentalities shown.

In the drawings.

DETAILED DESCRIPTION

Figure 1:
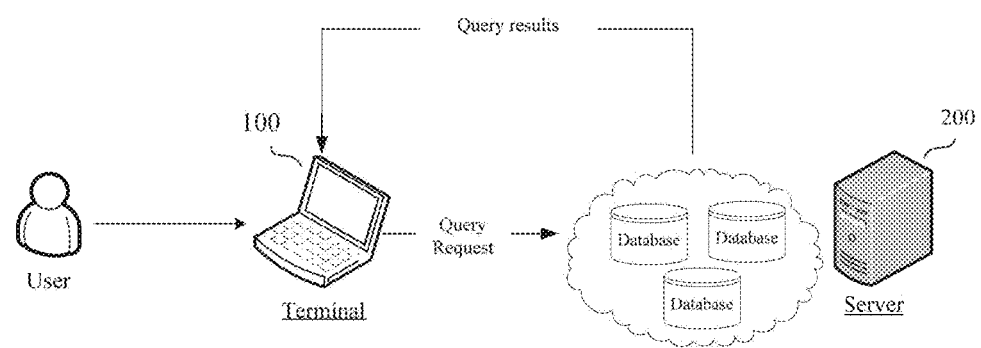
FIG. 1 shows a schematic diagram of paging the search results of a vector database according to embodiments of the present disclosure.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that cannot be present in all exemplary embodiments of the subject disclosure.

Illustrative embodiments of the present disclosure include, but are not limited to, an apparatus, method, and storage medium for database queries of pagination.

To facilitate a person skilled in the art in understanding embodiments of the present disclosure, some of the concepts and terms referred to in the embodiments of the present disclosure are explained below.

(1) A vector database: a database for storing, retrieving and analyzing vectors, which can be used to provide a service for retrieving a picture using a picture, such as face retrieval, human retrieval, vehicle retrieval, and the like. It can be understood that since most of the data are vectors, it is difficult to build an index. Therefore, each query operation on the vector database may be a full-table query.

(2) A vector: a data item having multiple dimensions, which can be obtained by encoding information in unstructured data. For example, a feature vector extracted from a picture, for representing attributes such as color, shape, outline, size, and display position of the picture.

(3) Distance: the distance between the two vectors, which can be obtained by calculating the corresponding vectors, can be used to sort the vectors in the vector database.

(4) Query Node: a working node for querying data in a vector database.

(5) Offset: for indicating how many rows of data are skipped in the data we now need, a reference to the specified number of rows area data in the database file may be returned by a user-given offset, and the returned reference may be data of a single database minimum cell area.

(6) Rows: that specifies the number of query records. For example, if 10000 pieces of data are queried and rows are set to 1, the query can be stopped if one of 10,000 pieces of data that meets the query requirements of the user is queried, and the record can be returned to the user.

(7) Limit: a function for taking out a specific portion of data from a result set to implement paging in which offset and rows can be specified to complete paging. For example, the user can give a query statement of "limit 100000, 10" in which the specified offset is 10000 and the specified rows is 10, and the specific query process of the database is to fetch the 10010 data, and then return the last 10 items, thereby realizing the page-by-page return of the result set data obtained by the query to the user.

It can be understood that the above-mentioned user may be a user having the right to operate using the database query, and is not specifically limited herein. It should be noted that there can be three query modes of the vector database according to the embodiment of the present disclosure:

(1) Search, also as SEARCH pattern, which is a pattern used for finding the limit vectors most similar to the specified vectors and returning;

(2) RangeSearch, also as RANGESEARCH pattern, which is a pattern used for providing a minimum or maximum distance, looking up all data within the required distance range from the specified vector;

(3) Query, also as QUERY pattern, which is a pattern used for obtaining data using a scalar filtering condition. It can be understood that the Search/Query according to an embodiment of the present disclosure is an mpp model with a minimum task execution granularity of Segment;

Illustratively, user requirements for queries of pagination can include the following two cases:

The first disclosure scenario is a real-time front-end paging presentation for services. As a typical example, when we search for an entry with a search engine, the first page results are often only about 30, and it is necessary to click the next page to display the results of items 30 to 60. This requirement has three characteristics: the amount of data is relatively controllable; allowing a small amount of data to be repeated; there is a need for performance. Therefore, to achieve the first user requirement, Offset+Limit data are searched back for each Segment.

A second disclosure scenario is where a large amount of data can be acquired in batches during offline processing. For example, in a scenario of a violation video screening, the total amount of data returned is unpredictable in advance, and Query cannot have data omission and repetition, while RangeSearch allows a small amount of data omission and repetition, which is not a requirement for high performance.

It can be understood that the quantity of the request data corresponding to the two query requests is different. The quantity of the request data of the first disclosure scenario is limited, for example, the upper limit is 10000 pieces of data. The quantity of the request data of the second disclosure scenario is very large. Therefore, different query methods can be determined according to different disclosure scenarios.

FIG. 1 illustrates a schematic diagram of a system for paging the search results of a vector database according to some embodiments of the present disclosure. While FIG. 1 illustrates various components contained in the system, FIG. 1 illustrates one example of a system of the present disclosure, and additional components can be added and existing components can be removed.

As shown in FIG. 1, the system includes a terminal 100 that is accessible by a user, who may be an administrative user. The terminal 100 can be connected to a server 200. The server 200 can be a cloud server. The server 200 can provide a database storage environment, and provide a plurality of Query Node for querying a database. In embodiments, a single Query Node may be deployed independently.

The terminal 100 can acquire a query request from the user, and send the query request to the server 200. In response, the server 200 can query the data in the database based on the query request to obtain a query result. Next, the server 200 can return the query result to the terminal 100 so that the user can query the query request corresponding data information through the server 200. When the amount of data requested is large, the user obtains too much query results at the same time, which may be inconvenient. Therefore, the query results need paging or pagination (hereinafter pagination).

When the database running on the server 200 is a vector database, the vector database may have a vector calculation in addition to obtaining scalar data like the RDBMS. In an example of the vector database according to the embodiment of the present disclosure, the vector calculation is performed in units of Segment, and the output results are ordered in distance in a fixed ordering manner. However, the distance data can only be calculated. This way of querying limits the implementation of pagination.

A query without vector calculations can also be included in the vector database. Since the data storage is designed and optimized for vector calculations, all scalars may only be ordered inside the files, and the files are out of order with no separate index. As an example, in Segment A, Segment B, and Segment C, the rowID of Segment A may be 1, 5, and 9, the rowID of Segment B may be 2, 3, and 8, and the rowID of Segment C may be 4, 6, and 10. Therefore, the rowID may be ordered in a single Segment, but the rowID of multiple Segments may be out-of-order. As such, it is difficult to skip the data of multiple files at the level of a certain row to reduce the calculation amount.

According to embodiments of the present disclosure, the database can be loaded into the memory in advance in order to accelerate the vector calculation, the scalar data, the original vector, or the index. Therefore, the memory resources of the vector database may be limited, and it may be difficult to implement pagination of a large amount of data based on the memory resources of the vector database.

In order to address the difficulty to realize a large amount of data pagination due to the shortage of memory resources of the vector database, the present disclosure provides a pagination method applied to a vector database, determines a pagination pattern and a request data amount by receiving a specified query parameter in a pagination request from a user, selects a target paging parameter and a target sorting parameter based on the request data amount and the query parameter, and performs paging processing on an obtained result set based on the target paging parameter and the target sorting parameter to obtain a target paging result set. By accurately judging a query requirement of the user based on the amount of the requested data, and then accurately selecting the pagination pattern, the calculation amount of the pagination in the vector database is reduced, thereby improving performance.

It can be understood that the target paging parameter can be a paging parameter specified by the user or can be a paging parameter selected by the server 200 based on the amount of requested data. In some embodiments, the target paging parameter can be determined as a cursor, which may be, for example, SegmentID, which may be used to locate the paging position of the target result set.

It can be understood that the above-mentioned target sorting parameter can be a sorting parameter specified by a user or can be a sorting parameter selected by the server 200 based on a quantity of requested data. The target sorting parameter can be, for example, a rowID or a primary key, and is used to sort a plurality of result sets obtained by a plurality of query nodes in a unified manner so as to facilitate aggregation processing, thereby obtaining a target result set corresponding to the query request.

Figure 2:
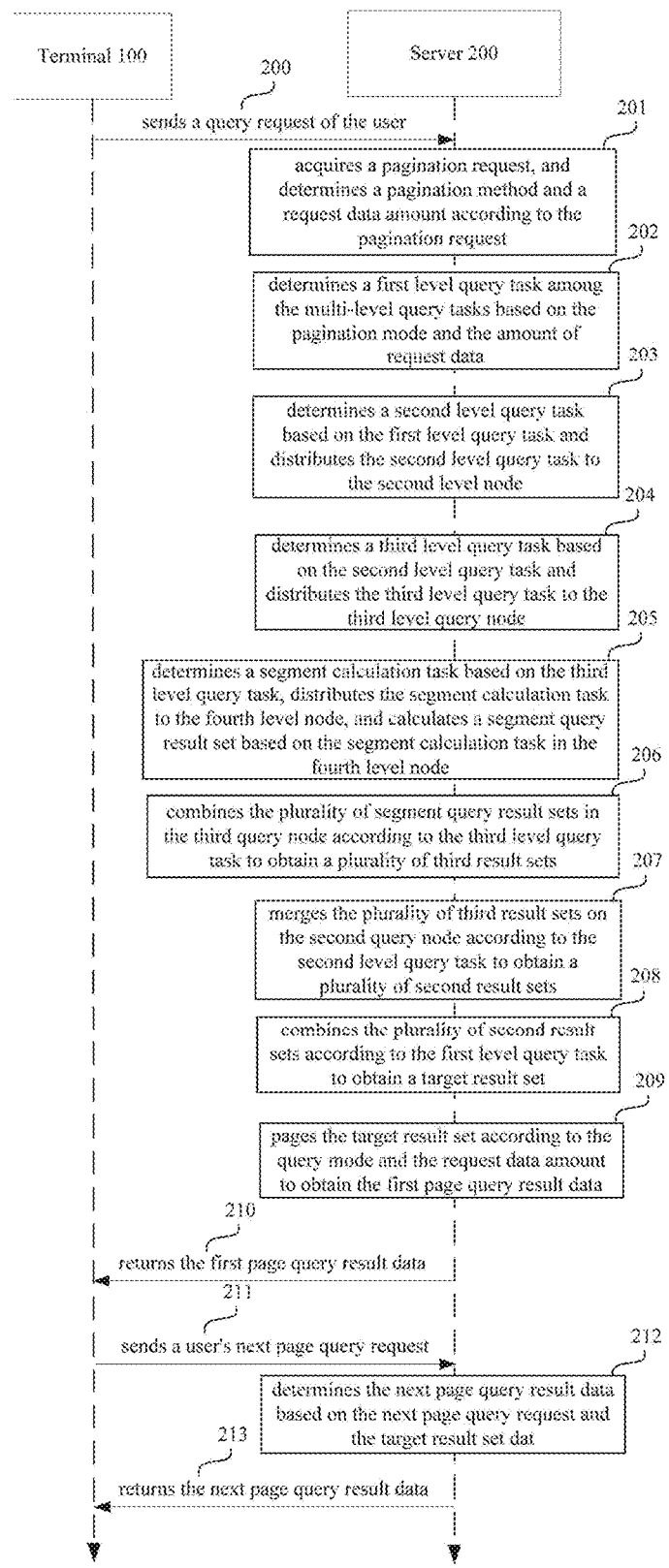
FIG. 2 shows a flow diagram of a paging or pagination method according to embodiments of the present disclosure.

In order to solve the above problems, FIG. 2 shows a flow diagram of a pagination method according to embodiments of the present disclosure. While FIG. 2 illustrates various steps or stages in the method, additional steps or stages can be added and existing steps or stages can be reordered or removed.

In 200, the terminal 100 sends a pagination request of the user to the server 200. For example, the terminal 100 acquires the pagination request of the user and transmits the pagination request of the user to the server 200.

In 201, the server 200 acquires a pagination request, and determines a pagination method and a request data amount according to the pagination request. For example, the server 200 acquires the pagination request from the user, and determines the corresponding pagination pattern and the requested data amount according to the pagination request.

In an example, an access module in the server 200 can acquire the pagination request of the user, and then the proxy server can determine the pagination pattern and the requested data amount according to the pagination request. The proxy server can acquire a user pagination request and determine a corresponding query parameter based on the pagination request. The query parameters can include a pagination pattern and a request data amount, and a corresponding target query mode can be determined based on the request data amount. For example, when the amount of requested data is less than or equal to a preset threshold value, a query pattern for real-time front-end paging presentation can be determined. To satisfy the user requirement in the disclosure scenario of the real-time front-end paging display, a pagination is performed based on the pagination pattern specified by the query parameter. For example, when it is determined that the paging pattern mode is offset+limit, an offset+limit query is performed on the database data. The offset+limit query means that, assuming that the query request returns 1000 results in total, after sorting the 1000 results, the first offset results are skipped and limit results are taken as query results to be fed back to the user to complete the pagination.

It can be understood that the corresponding sorting parameters can be determined by the pagination pattern and the target query mode for aggregate sorting of the query result set. For example, the sorting parameter corresponding to offset+limit is the primary key, and for example, the user specifies the sorting parameter as the primary key in the query request. In this case, when it is determined that the sorting parameter is the primary key, after the 1000 results in the above-mentioned embodiment are sorted according to the primary key, the first offset results are skipped, and the limit results are taken as the query results to be fed back to the user so as to complete the pagination.

In 202, the server 200 determines a first level query task among the multi-level query tasks based on the pagination pattern and the amount of request data. For example, after determining the pagination pattern and the amount of data requested, a first level query task is determined.

In any example, the server 200 can include a Proxy module. It can be understood that the Proxy module refers to a proxy server. For example, when a user performs an operation on a database, the proxy server can record the operation performed by the user after the user completes the operation on the database. In some embodiments, the Proxy module can generate a paged query request as a first level query task and distribute the first level query task as a multi-level query task to the multi-level nodes to complete a full query of database data.

Figure 3A:
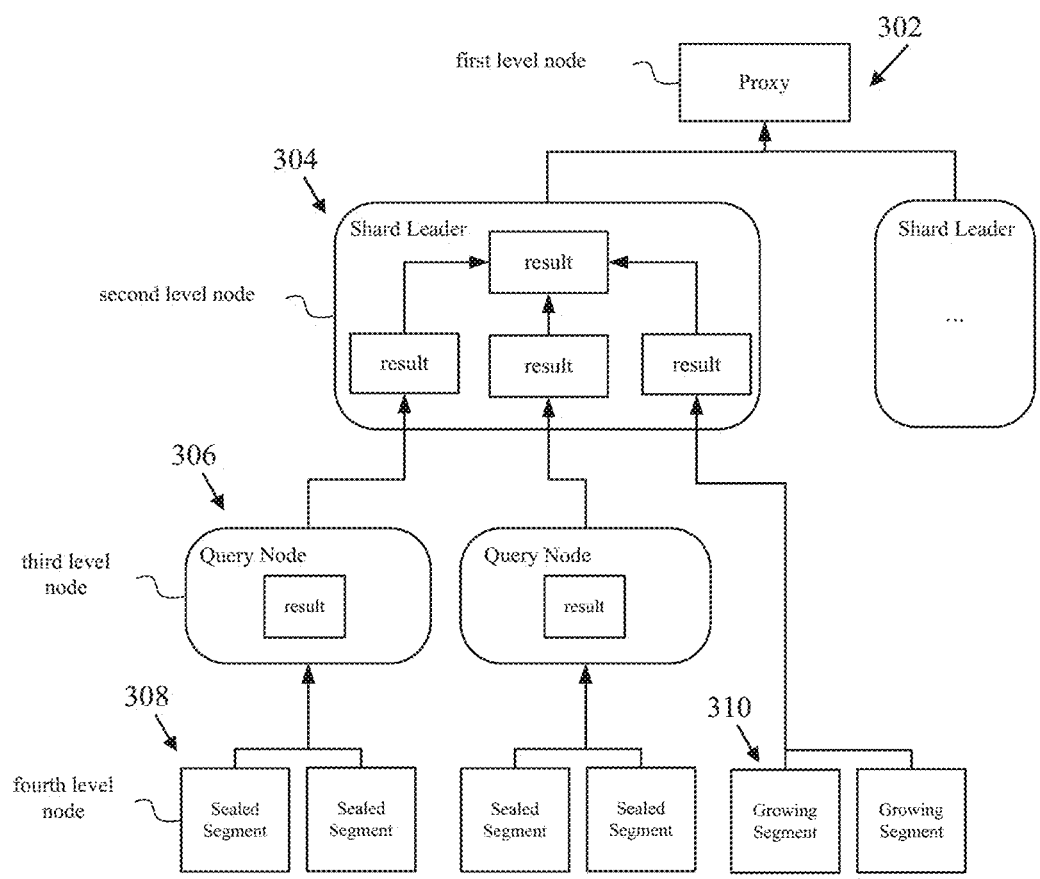
FIG. 3a shows a schematic diagram of a system framework structure of a vector database according to embodiments of the present disclosure.

FIG. 3a shows a schematic diagram of a system framework structure of a vector database according to embodiments of the present disclosure. Referring to the example of FIG. 3a, the Proxy module 302 is a first-level node for obtaining a pagination request from a user, generating a first-level query task based on the pagination request, and splitting the first-level query task into second-level query tasks to be distributed to a plurality of second-level nodes. A Shard Leader 304 is a second level node for obtaining a second level query task sent by the Proxy and splitting the second level query task into a plurality of third level query tasks to be distributed to the plurality of third level nodes. A Query Node 306 is a third level node for obtaining a plurality of third level query tasks, and generating a plurality of fourth level query tasks based on the third level query tasks to query database data in the plurality of fourth level nodes. A Segment is a fourth level node for storing all database data loaded from the database storage module, where Segments can include Sealed Segment 308 and Growing Segment 310.

It can be understood that segment is the minimum storage unit of the vector database, and a plurality of Segments are stored as the fourth level node in the corresponding third level node Query Node 306. Growing Segment 310 is a Query Node subscription, and the user continues to write Segment. After Growing Segment 310 is written to the upper storage capacity limit, Growing Segment 310 is sealed, and some vector indexes are created for Sealed Segment 308. In some embodiments, when a Segment changes from Growing Segment 310 to Sealed Segment 308, if the COLLECTION of the Segment has established an index, the vector database will wait for the Segment to complete the index and then load the indexed Sealed Segment 308 to replace the original Growing Segment 310, thus greatly improving query performance, where the COLLECTION is a table that can be mapped to a legacy database.

It can be understood that the plurality of third-level nodes Query Node 306 belong to the corresponding second-level nodes Shard Leader 304. The database data is loaded through the third-level nodes Query Node 306 stored on the plurality of second-level nodes Shard Leader 304, so as to load the database data on the basis of the fragments of each second-level node Shard Leader 304, so that the database fragments are queried according to the pagination request, thereby effectively improving the calculation speed in the query process. Finally, the results fed back by the plurality of second-level nodes Shard Leader 304 are aggregated through the first-level node Proxy 302 to obtain a target result set, which is fed back to the user.

It should be noted that the Proxy module 302 can record the instruction implementation procedures set forth in all embodiments of the present disclosure and generate corresponding log files for ease of reference. In some embodiments, Query Node (QN), for example, Query Node 306, can calculate the database data in the queried Segment to obtain the calculated distance and query results. The plurality of query results acquired by the plurality of QN can be transmitted to the Shard Leader 304, and the Shard Leader 304 aggregates the acquired plurality of query results to obtain a target query result set and sends the target query result set to the Proxy module 302 to feed back the target query result set to the user.

Returning to FIG. 2, in 203, the server 200 determines a second level query task based on the first level query task and distributes the second level query task to the second level node.

Figure 3B:
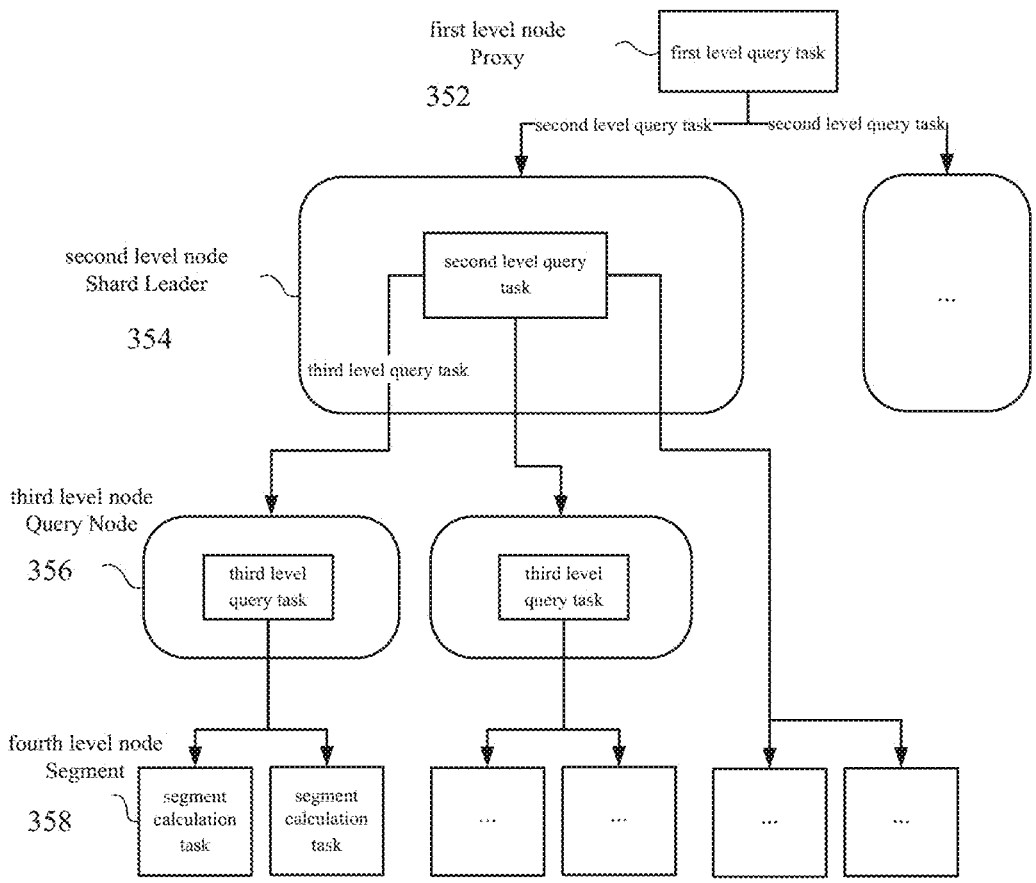
FIG. 3b shows a flow diagram of a method for generating a database query task according to embodiments of the present disclosure.

For example, as illustrated in FIG. 3b, a Proxy 352 determines a second level query task based on query parameters in the first level query task in conjunction with the number of second level nodes, and distributes the second level query task to the second level node, (e.g., Shard Leader 354). In some embodiments, the designated second level node name may be determined by a query parameter to affect a query of the designated second level node, thereby affecting a fragmented query of the database data.

In 204, the server 200 determines a third level query task based on the second level query task and distributes the third level query task to the third level node.

For example, with continued reference to FIG. 3b, the second-level node Shard Leader 354 determines the third-level query task based on the query parameters in the second-level query task in combination with the number of third-level nodes, distributes the third-level query task to the third-level query node, such as a QN 356, and performs query calculation on the Segment through a plurality of QN synchronization, thereby effectively improving computation efficiency.

In 205, the server 200 determines a segment calculation task based on the third level query task, distributes the segment calculation task to the fourth level node, and calculates a segment query result set based on the segment calculation task in the fourth level node.

For example, with continuing reference to FIG. 3b, the third level node QN 356 determines a segment calculation task based on query parameters in the third level query task in conjunction with the number of fourth level nodes, and distributes the segment calculation task to the fourth level node Segment 358 at the next level relative to QN. Then, a segment query result set is calculated corresponding to each segment in the fourth level node based on the segment calculation task.

In 206, the server 200 combines the plurality of segment query result sets in the third query node according to the third level query task to obtain a plurality of third result sets.

For example, referring to FIG. 3a, the server 200 merges the plurality of segment query result sets described above in the third level node QN 356 of the third level based on the third level query task, and aggregates a single third result set in a single QN. For example, if the user designates offset+ limit as the paging parameter and determines the target query mode as the instant query mode from the requested data amount, when RangeSearch is used as the pagination pattern, the third-level node QN 356 discards the first offset results after sorting according to distance when merging the segment query result sets, and obtains the first limit results from the remaining results, and then sorts the limit result sets extracted from each segment again based on distance to obtain the third result set.

In 207, the server 200 merges the plurality of third result sets on the second query node according to the second level query task to obtain a plurality of second result sets.

For example, with continuing reference to FIG. 3a, the server 200 merges the plurality of third result sets described above in the Shard Leader 354 based on query parameters in the second level query task to obtain a plurality of second result sets. For example, when the user designates offset+ limit as the paging parameter and determines the target query mode as the instant query mode from the requested data amount, when Query is used as the pagination pattern, the second-level node Shard Leader 354, when merging the third result set, discards the first offset results according to the rowID or the primary key, and obtains the first limit results from the remaining results, and then sorts the first limit results extracted from each QN 356 again based on the rowID or the primary key to obtain the second result set.

In 208, the server 200 combines the plurality of second result sets according to the first level query task to obtain a target result set.

For example, with continuing reference to FIG. 3a, the server 200 merges the plurality of second result sets described above in the Shard Leader 354 based on the first level query task to obtain a target result set. It can be understood that the data partition query can be implemented by Proxy 352 distributing the first level query tasks to Shard Leader 354. Queries performed in different Shard Leader's 354 can be performed based on different dimensions, and query results obtained by different Shard Leader's are different from each other. When the Shard Leader 354 distributes the second-level query task to the QN 356, the second-level query task may be divided into multiple replica tasks. Finally, the sub-node that distributes the second-level query task to the QN 356 completes the calculation of the vector in the vector database for the query task of the Segment 358, and then performs layer aggregation on all the obtained result sets to obtain the target result set, thereby completing query processing.

In 209, the server 200 pages the target result set according to the query mode and the request data amount to obtain the first page query result data.

For example, the server 200 can determine a corresponding target paging parameter and a target sorting parameter based on the amount of the request data and the query parameter, and perform paging processing on the acquired result set based on the target paging parameter and the target sorting parameter to obtain the target paging result set.

In some embodiments, an example of a method of paging a target result set is as follows.

A query request from a user is acquired, and if it is determined based on the query request that the data amount of the request is less than a preset threshold value, the current pagination requirement may be defined as an immediate query requirement. In this case, it may be considered that the user has a certain requirement for query performance. Then, the paging processing of the target result set is realized based on different query modes specified by the user in combination with the paging parameters, and the target query mode can be determined as the instant query mode. The following is exemplified by the paging parameters offset and limit:

(1) When the query method specified by the user is Search, an example of the step of performing paging processing on the result obtained by Search is as follows: The Proxy 352 loses the first offset data in the target result set obtained by Search, and returns limit data from the remaining result to the user as the first page result set, so that the user can obtain the pagination result. It can be understood that Proxy 352 uses offset+limit as the number of results of the first level query task request when distributing the first level query task.

(2) When the query method specified by the user is RangeSearch, an example of the step of performing paging processing on the result obtained by RangeSearch is as follows: Since the RangeSearch supports returning only a fixed number of results from the Segment level and sorting according to the distance, the Query Node 356 may take only the results of the offset+limit before sorting and sort when merging the segment query result sets. After the Proxy 352 obtains the target result set, the first offset data is discarded, and limit data are obtained from the remaining results, so that the user can obtain the pagination result.

(3) When the query method specified by the user is Query, an example of the step of performing paging processing on the result obtained by Query is as follows: The data in the segment result set obtained by each Segment query are sorted according to the rowID or the primary key. Then, when the Query Node 356 merges the segment result set, only the results of the previous offset+limit are sorted and sorted. Finally, after the Proxy 352 obtains the target result set, the Proxy discards the data of the previous offset, and then obtains limit data from the remaining results, so that the user can obtain the pagination result. It can be understood that Query can be used to support the SQL database by dropping the first offset data and taking limit data from the remaining results. It should be noted that the method for performing pagination by using the offset in conjunction with the limit has the advantage that the method is more flexible than other query methods, and can realize random page skipping of the query result without changing the storage format and has no compatibility effect. The disadvantage is that a lot of data needs to be skipped at a time. The larger the value of the offset is, the worse the query performance is, and the speed of returning the result is very slow.

In 210, the server 200 returns the first page query result data to the terminal 100.

For example, the first page query result data can be obtained from the target result set after paging, e.g., the results of Query each Segment 358 are sorted according to rowID or PK. For the Query Node 356, when merging query results, only the results of the offset+limit before sorting are taken and sorted. After the Proxy 352 merges the query results, the first offset data are discarded and limit data are taken from the remaining results, which is the first page query result data.

In 211, the terminal 100 sends a user's next page query request to the server 200 to request query result data of the next page from the server 200.

In 212, the server 200 determines the next page query result data based on the next page query request and the target result set data.

In 213, the server 200 returns the next page query result data to the terminal 100 so that the user can obtain the paged query result data.

It can be understood that, based on the implementation flow of the above steps 201 to 213, the method for paging the search results of the vector database provided in the embodiment of the present disclosure can control the resources occupied by the pagination while meeting various paging requirements of the user, without affecting the performance of other queries.

Figure 4:
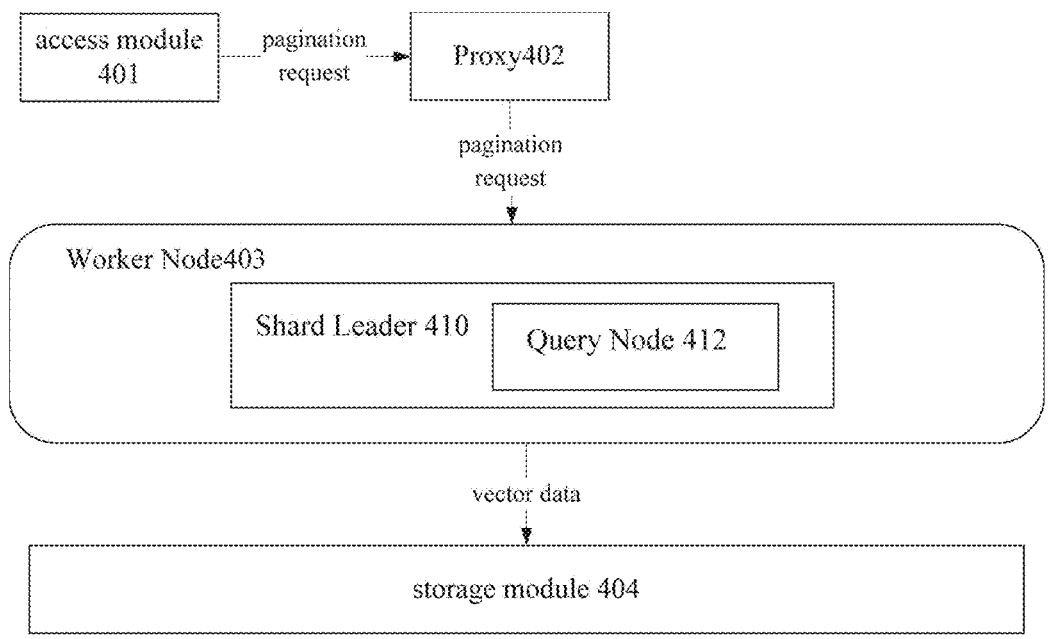
FIG. 4 shows a schematic diagram of a system framework structure of a server according to embodiments of the present disclosure.

FIG. 4 shows a schematic diagram of a system framework structure of a server 200 provided according to embodiments of the present disclosure. While FIG. 4 illustrates various components contained in the system, FIG. 4 illustrates one example of a system of the present disclosure, and additional components can be added and existing components can be removed.

The server 200 can be a cloud server on which one or more access or "port" modules 401, one or more proxies 402, one or more worker nodes 403, and one or more storage modules 404 are provided. The port module 401 can include an SDK access port for obtaining a query request sent by a user and sending the query request to the Proxy 402. The Proxy 402 can be used to acquire a query request sent by a user, generate a load request based on the query request, and send the load request to the Worker Node 403.

The Worker Node 403 is used for querying database data. Worker Node 403 can include at least two Shard Leaders 410, each Shard Leader 410 may include at least one Query Node 412, where Shard Leader 410 is a query node at a first level and Query Node 412 is a query node at a second level. When the Worker Node 403 obtains the query request and the load request, the load request is first sent to the storage module 404 to obtain the full amount of database data in the storage module 404. For example, all the vector data in the vector database according to the embodiment of the present disclosure is cached in the memory of the Worker Node 403 to accelerate the vector operation involved in the query process and improve the query performance of the vector database.

It can be understood that the Shard Leader 410 can be used to partition the vector data in the cache vector database. It should be noted that each Shard Leader 410 is separated in both a physical and a software sense, thereby improving data security. The Shard Leader 410 is used to direct each data-fragmented Query Node cluster, each Shard Leader 410 may include at least two Query Node 412, and each Shard Leader 410 may partition the database data loaded from the storage module 404 and store it to each Query Node 410 internally in order to improve computational performance during query calculations while also facilitating the provision of partitioned queries for users.

Figure 5:
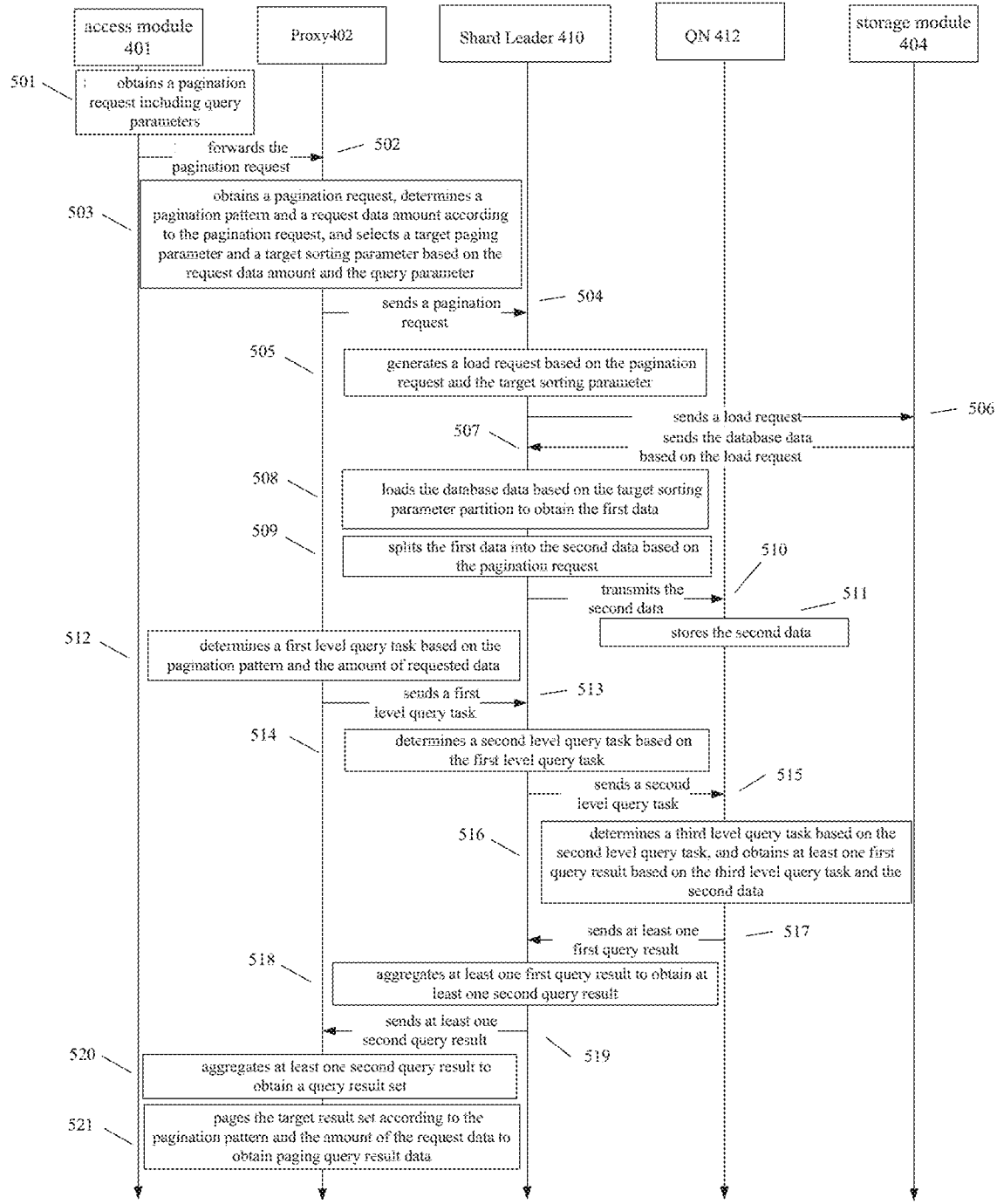
FIG. 5 shows a method flow diagram of a database pagination according to embodiments of the present disclosure.

Based on the system framework structure of a server 200 illustrated in FIG. 4, in the use scenario of the first real-time front-end paging presentation described above, FIG. 5 shows a method flow diagram of a database pagination according to embodiments of the present disclosure. While FIG. 5 illustrates various steps or stages in the method, additional steps or stages can be added and existing steps or stages can be reordered or removed.

In 501, the access module 401 obtains a pagination request including query parameters. For example, the access module 401 can be an SDK in which query parameters, paging parameters, and ranking parameters may be preset, wherein the paging parameters include, but are not limited to, a cursor set in which at least one cursor is included. In some embodiments, the server 200 does not use underlying storage because the memory resources of the vector database according to embodiments of the present disclosure are very tight. However, in the process of implementing the pagination by using the cursor, if some data is skipped without a cache, performance is improved, and it is necessary to rely on the underlying storage of the data. To solve the above problems, in other embodiments, the cursor may be returned to the client; alternatively, the cursor is selected by the client.

For example, the cursor set includes a plurality of cursor. A user may specify a cursor used during a query in a query request so that subsequent Query Node may use the cursor to page query results. The access module 401 in the server 200 may also select the corresponding cursor based on the received query request.

In 502, the access module 401 forwards the pagination request to the Proxy 402. For example, the pagination request may include a user-specified query parameter, for example, the SDK obtains a user-specified cursor, and sends the above-described pagination request specifying the cursor to the Proxy 402 to implement a pagination specifying the cursor.

In 503, the Proxy 402 obtains a pagination request, determines a pagination pattern and a request data amount according to the pagination request, and selects a target paging parameter and a target sorting parameter based on the request data amount and the query parameter. For example, the Proxy 402 obtains a pagination request, determines a pagination pattern and a request data amount according to the query parameters in the pagination request, and selects a target paging parameter and a target sorting parameter based on the request data amount and the query parameters. The target paging parameter and the target sorting parameter as described below in further detail.

In 504, the Proxy 402 sends a pagination request to the Shard Leader 410. For example, the Proxy 402 sends a pagination request to the Shard Leader 410 for partition loading of database data based on the pagination request.

In 505, the Shard Leader 410 generates a load request based on the pagination request and the target sorting parameter. For example, the Shard Leader 410 generates a load request based on the query mode and the target ordering parameter determined by the pagination request so that the target paging parameter of the pagination is valid.

For example, based on the fact that the amount of the requested data is less than the preset threshold value, the current pagination requirement may be defined as an immediate query requirement. In this case, the user may be considered to have a certain requirement for query performance. And paging processing of the target result set is realized based on different query modes specified by the user combined with paging parameters. When the paging parameter is cursor, a load request needs to be generated according to sorting parameters corresponding to different cursor, and the association relationship between cursor and sorting parameters is exemplified with reference to the following multiple related embodiments.

It can be understood that an example of cursor applied in a scalar database is as follows:
SQL
SELECT *
FROM sales
WHERE sale_data<A
ORDER BY sale_data DESC
LIMIT 10

The sale_data=A in the SQL statement is actually the value of a cursor, the last data in the last LIMIT result. This statement improves performance because it is indexed. In the scalar database, the sale_data may have an index, and the data may be sorted, and a range of data may be selected for query by the cursor. However, in the vector database, since an explicit index cannot be set, each query is a full-table query. Therefore, setting cursor for the pagination of the vector database is related to the following factors: (1) A basis for sorting search results; and (2) Whether or not some data can be skipped on the underlying data store starts from the middle. If the underlying data store cannot support skipping, for example, a case in which the sale_data does not build an index, the entire table is traversed every time.

In embodiments, the follow process may be used as a plurality of options cursor:
Process 1:
In the search method applied to the Query, the segmentID may be combined with the offset as the cursor to implement the pagination. Since segmentID increases in time, as a cursor, very many Segments will be skipped, greatly improving performance. However, since the returned data is out of order, it is more suitable for disclosure scenarios in which a large amount of data is acquired in batches. In addition, it can be understood that in practical disclosure scenarios where a plurality of small Segment is combined by the compaction, the segmentID in the cursor may fail due to the combination of the Segment. Here, the compaction performs a persistent storage process for the newly added write data in the Segment. In some embodiments in which compaction is applied, after the data written or deleted in the Segment reaches a predetermined amount, the data corresponding to all write and delete operations are written and deleted, and the data finally obtained by completing the above operations is stored. In the storage process, the Segment with a small amount of data is merged to compress the storage space, thereby reducing the storage space occupation. Therefore, in an actual disclosure scenario in which the deletion processing is performed on the plurality of Segment by the compaction, the segmentID in the cursor may be not sequentially arranged because the Segment data is partially deleted.

In this process, it may be necessary to sort the IDs in units of Segment during loading of the database data so that the segmentID is valid in combination with the offset as the cursor. That is, the Segment can be used as a sorting parameter so that the segmentID can implement the pagination as the cursor.

Process 2:

In the search method applied to the Query, the primary key may be used as the cursor to implement the pagination. It can be understood that if the primary key is used as cursor, the query results must be sorted and aggregated according to the primary key. If the Segment itself is sorted by the primary key, but there is a duplicate primary key between multiple Segment, and each time Query (id>2222) still searches for all Segment. In order to achieve performance improvement, the primary key column needs to be indexed. Therefore, there is a need to ensure that the read and/or write of the Segment and the binlog are sorted using the primary key, while ensuring compatibility of the Segment with the old data.

By way of example:
SQL
SELECT * FROM c
ORDER BY id
LIMIT 10;
SELECT * FROM c
WHERE id>10
ORDER BY id
LIMIT 10.

If the Segment itself and the primary keys to each other are sequential and do not overlap, the primary key can greatly improve performance as a cursor. It can be understood that in order to achieve that the primary keys between multiple Segment and the primary keys within each Segment are ordered and non-overlapping, it may be necessary to reconstruct the path and to ensure compatibility of the new Segment file with the old Segment file. In the present embodiment, the primary key may be used as the sorting parameter during loading of the database data, so that the primary key can be used as the cursor to implement the pagination.

Process 3

In the search method applied to Query, a pagination may be implemented with a time stamp (Ts) as cursor. In order to achieve a time stamp as cursor, it is ensured that each line of the Segment corresponds to a different time stamp, and that the internal data of the Segment and the data between the plurality of the Segment are sorted according to the time stamps. In some embodiments, the database data is sorted by the primary key in the storage module 404, and in loading the database data into the memory of the Query Node, sorting all the loaded database data according to the time stamps generated by the loading enables the time stamps to be paged as valid cursor. This approach can consume certain computational resources and may result in performance losses. In this process, a time stamp can be used as a sorting parameter during loading of the database data so that the time stamp can implement a pagination as cursor.

Process 4

In the search method applied to the Query, a pagination may be implemented with rowID as cursor. Here, rowID is a globally unique ID generated inside the system to distinguish each row, and therefore it is more compatible with existing storage logic to use rowID as cursor. Now in each Segment, whether at the physical level or at the software level, the memory is stored in such a manner that rowID is used as a sort parameter. Similar to the time stamps described above, rowID is also used to represent the write order. Since the user cannot visually obtain the rowID through the query interface during use, in an actual disclosure scenario, the user cannot observe the sorting of the rowID when obtaining the returned pagination result set, which may make it difficult for the user to understand the sorting manner of the data.

Further, in order to reduce the difficulty in understanding the user, in this process, the autoID preprocessing mode is set: when the autoID is started, the rowID can be filled in the column corresponding to the primary key, so that the primary key ID automatically generated in the subsequent returned target result set is the rowID, so that the user can visually obtain the sorting mode of the data in the result set.

It can be understood that while the Segment is internally sorted on the basis of rowID, there is an overlap of rowID between the individual Segments. Therefore, when a user performs a pagination by using the Query as a query method, it is impossible to reduce the calculation amount by using the rowID as the cursor. However, by using the rowID as the cursor, it is possible to filter out some results each time, and the results obtained after repeated multiple queries are less and less, so that an effective query can be performed.

In some embodiments, the columns corresponding to the primary key may be populated with rowID as a sort parameter during loading of the database data to enable the rowID to implement queries of pagination as cursor.

Process 5

In the search method applied to the RangeSearch, a pagination can be implemented with the radius as the cursor. In order to achieve radius as cursor, the query results obtained by RangeSearch need to be sorted according to distance. In some embodiments, RangeSearch supports a search value range of (0.8, 0.9). It can be understood that the distance ordering may vary depending on the metric type. For example, in an actual disclosure scenario, based on the first query request issued by the user, all 10000 requests with the maximum of Segment distance>0.8 and range may be returned. Then, the result corresponding to the 10000 requests is aggregated via the Shard Leader and the Proxy, and it is finally determined that the maximum distance of the 10000 data is 0.999. Based on the next query request (Next request) issued by the user, the current query condition becomes: where distance>0.8 && distance<0.999, 10000 pieces of data. In the present embodiment, the sorting parameter of distance may be used as the sorting parameter during loading of the database data so that the radius can implement the pagination as the cursor.

Returning to FIG. 5, in 506, the Shard Leader 410 sends a load request to the storage module 404. For example, the Shard Leader 410 obtains the database data of the storage module 404 by sending a load request.

In 507, the storage module 404 sends the database data to the Shard Leader 410 based on the load request. For example, the storage module 404 can be S3 cache. In some embodiments, the S3 cache loads the database data into the memory of the Shard Leader 410 based on the fetched load request to accelerate the calculation process in the query.

In 508, the Shard Leader 410 loads the database data based on the target sorting parameter partition to obtain the first data. For example, the Shard Leader 410 loads database data into different fragments based on the target sorting parameters to obtain the first data. It can be understood that the first data is stored in each Shard Leader and that partitioning queries in a single or multiple Shard Leader may be implemented by splitting the entire database data into multiple first data.

In 509, the Shard Leader 410 splits the first data into the second data based on the pagination request. For example, the Shard Leader 410 includes a Query Node cluster, and the Shard Leader 410 splits the first data into second data based on the pagination request, and loads each of the second data into each corresponding Query Node so that each Query Node can perform a pagination based on the pagination request.

It can be understood that, referring to FIG. 3a, the second-level node Shard Leader 304 includes a Query Node 306 cluster, and a fourth-level node Segment is stored on the third-level node Query Node. After the second data is loaded into the Query Node 306 cluster, a plurality of Segment stored in the third-level node Query Node 306 is formed, so that each Query Node 306 can perform a pagination based on a pagination request, thereby accelerating calculation of the pagination and improving query performance.

In 510, the Shard Leader 410 transmits the second data to the Query Node 412. For example, the Shard Leader 410 can load each portion of the second data into each corresponding Query Node so that each Query Node may execute a pagination based on a pagination request, speeding up calculation of the pagination, and improving query performance.

In 511, the Query Node 410 stores the second data. For example, after each Query Node 410 stores the second data, a pagination can be executed based on the pagination request to accelerate calculation of the pagination and improve query performance.

In 512, the Proxy 402 determines a first level query task based on the pagination pattern and the amount of requested data.

In 513, the Proxy 402 sends a first level query task to the Shard Leader 410.

In 514, the Shard Leader 410 determines a second level query task based on the first level query task.

In 515, the Shard Leader 410 sends a second level query task to the Query Node 412.

In 516, the Query Node 412 determines a third level query task based on the second level query task, and obtains at least one first query result based on the third level query task and the second data.

In 517, the Query Node 412 sends at least one first query result to the Shard Leader 410.

In 518, the Shard Leader 410 aggregates at least one first query result to obtain at least one second query result.

In 519, the Shard Leader 410 sends at least one second query result to the Proxy 402.

In 520, the Proxy 402 aggregates at least one second query result to obtain a query result set.

In 521, the Proxy 402 pages the target result set according to the pagination pattern and the amount of the request data to obtain pagination result data. For the above steps S12 to S21, reference can be made to the above steps 201 to 213, for additional details that are not described in reference to FIG. 5.

It can be understood that by the database pagination method provided in steps 501 to 521, sorting of the database data in the memory of the query node is completed so as to make the pagination pattern specified by the user effective, thereby realizing real-time pagination in case of insufficient memory of the vector database according to the embodiment of the present disclosure, and effectively improving performance.

It can be understood that the multiple embodiments described above satisfy a first user requirement from a user to perform a real-time query with an amount of query data less than a preset threshold. When the amount of query data is greater than a preset threshold value, it can be determined that the user desires to acquire a large amount of data in batches, for example, to perform video query offline. To this end, the present disclosure proposes another method of paging search results of a vector database. In the disclosure scenario in which a large amount of data is acquired in batches in the present embodiment, the result obtained by the Query or RangeSearch search may be full-table data. However, the memory of the vector database according to the embodiment of the present disclosure is insufficient to store the result set including the full-table data, so that the query result cannot be aggregated in the memory. In this case, the minimum amount of memory required by the Query Node to perform the pagination is "number of concurrent Segment"*2. In the present disclosure scenario, the query does not require high performance. Therefore, the Query Node does not need a high concurrency task, and only needs to perform the query in the Segment order.

It can be understood that in the present disclosure, the query result set does not need to be ordered, and the user needs to obtain all result data corresponding to the query request. Therefore, the proxy does not need to perform aggregation processing after obtaining multiple results, but defines the quantity and condition of the queried result data obtained each time by the proxy, and feeds back the queried result data to the user directly as the target result set. For example, the proxy may complete a single query according to segmentID as cursor and obtain a result set satisfying a corresponding number of user query requests, which is the pagination result data of the first page.

It can be understood that in order to limit the use of resources, the following limitations may be set in the process of obtaining a large amount of data in this embodiment.

(1) The Collection level concurrently with up to three different tasks for obtaining large amounts of data in batches. It can be understood that the number of tasks concurrent herein may be configured by the user and is not limited herein.

(2) When the Query Node performs query processing, queries for at most one Segment are concurrently performed. It can be understood that the number of Segment's of concurrent queries herein may be configured by the user and is not limited herein.

(3) The client cannot share or concurrency the cursor of the same query task, which is used to obtain large amounts of data in batches.

(4) The results returned from the query task are out of order.

Illustratively, the above-described cursor may be obtained based on a combination of collection, a time stamp, segmentID, and offset.

Figure 6:
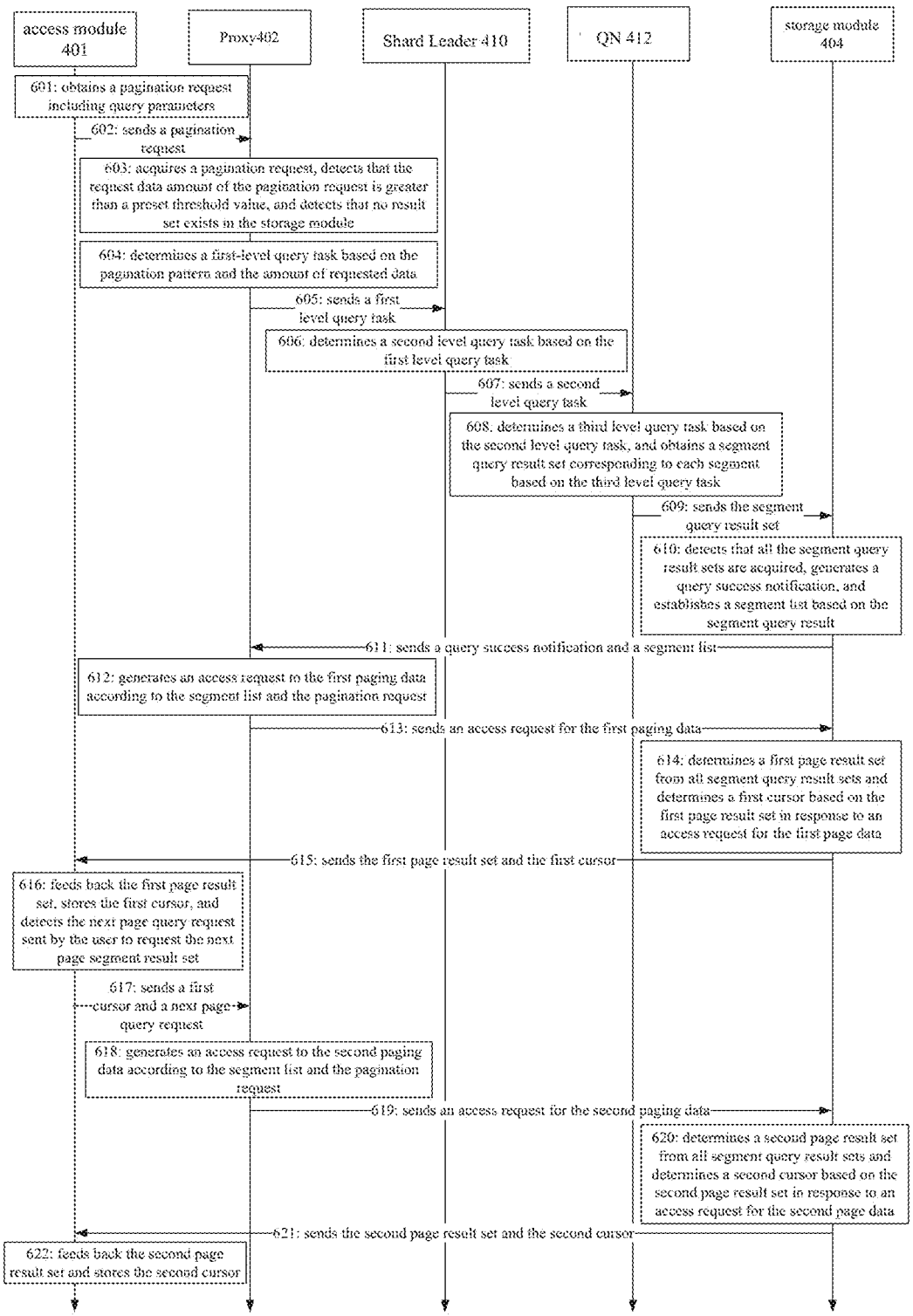
FIG. 6 shows a flow diagram of yet another database paging or pagination method according to embodiments of the present disclosure.

In order to solve the problem that a vector database memory according to embodiments of the present disclosure cannot aggregate all result sets, FIG. 6 shows a flow diagram of yet another database pagination method according to embodiments of the present disclosure. While FIG. 6 illustrates various steps or stages in the method, additional steps or stages can be added and existing steps or stages can be reordered or removed.

In 601, the access module 401 obtains a pagination request including query parameters.

In 602, the access module 401 sends a pagination request to the Proxy 402. It can be understood that the above steps 601 and 602 may refer to 501 and 502 above for additional details.

In 603, the Proxy 402 acquires a pagination request, detects that the request data amount of the pagination request is greater than a preset threshold value, and detects that no result set exists in the storage module. For example, the storage module 404 can be S3 cache. Here, the cache on the S3 cache can be obtained through the Proxy 402. When it is detected that the amount of requested data of the pagination request is greater than a preset threshold value, it can be determined that the request of the user is a pagination scenario of mass data. In this scenario, the Proxy 402 detects that there is no result set in the storage module, and then forwards the pagination request to the Query Node 412 for query.

In 604, the Proxy 402 determines a first-level query task based on the pagination pattern and the amount of requested data.

In 605, the Proxy 402 sends a first level query task to the Shard Leader031.

In 606, the Shard Leader 410 determines a second level query task based on the first level query task.

In 607, the Shard Leader 410 sends a second level query task to the Query Node 412. It can be understood that the above steps 604 to 604 may be referred to 512 to 515 above for additional details.

In 608, the Query Node 412 determines a third level query task based on the second level query task, and obtains a segment query result set corresponding to each segment based on the third level query task. For example, the Query Node 412 queries the second data already cached on the Query Node 412 based on the pagination pattern and query parameters. Since no sorting is required, a query is directly performed according to each segment, and no reordering of the database data in each segment is required.

In 609, the Query Node 412 sends the segment query result set to the storage module 404. For example, the Query Node 412 can send a segment query result set to the storage module 404 every time a segment query result set is queried.

In 610, the storage module 404 detects that all the segment query result sets are acquired, generates a query success notification, and establishes a segment list based on the segment query result. For example, the storage module 404 detects that all segment query result sets have been acquired, which means that the query has been successfully completed and a query success notification is generated. The above segment query result sets do not need to be aggregated and reordered. In the present disclosure scenario, it is only necessary to feed back all queried segment query result sets to the user in batches. Establishing a segment list based on the segment query result, so that the Proxy 402 determines a segment query result set corresponding to the accessed segment based on the segment list. It can be understood that each segment query result set is ordered with internal data while the data between the segment query result sets is out of order.

In 611, the storage module 404 sends a query success notification and a segment list to the Proxy 402. For example, the storage module 404 sends a query success notification and a segment list to the Proxy 402 so that the Proxy 402 determines a segment query result set corresponding to an accessed segment based on the segment list. It can be understood that the memory module 404 can be an S3 cache. The storage module S3 cached as the server 200 can set the storage format of the query result in S3 to be stored in rows, and the query result includes the entire output field specified by the user. The output field may be determined according to the user request, and the output field may be used to specify the column data in the query result.

It can be understood that the data in the S3 cache needs to be decoded before being read. When the query result is stored in the S3 cache, if the entire query result file is not decoded, the content of the query result may not be identified. In order to facilitate reading and identifying the query results, in some embodiments, the storage format of the query results in the segment result set may also be defined as a header, which includes a number of rows in the Meta, wherein the number of rows is custom metadata for each cloud vendor for providing meta information corresponding to each query result, such as x-aws-meta- or x-goog-meta-. Therefore, the content corresponding to the query result can be directly identified based on the header and the Meta, and the identification of the query result can be completed without wasting system resources. Further, Segments less than segmentID may be released in advance, and may be applied to a disclosure scenario in which Query and/or RangeSearch are used for query. In addition, after caching the query result, the query result is not affected by the compaction.

In 612, the Proxy 402 generates an access request to the first paging data according to the segment list and the pagination request. For example, the Proxy 402 generates an access request to the first paging data based on the segment list and the pagination request.

In 613, the Proxy 402 sends an access request for the first paging data to the storage module 404.

For example, the Proxy 402 sends an access request for the first paging data to the storage module 404. Here, the Proxy 402 may determine the Segment of the access request based on the returned Segment list. In 614, the storage module 404 determines a first page result set from all segment query result sets and determines a first cursor based on the first page result set in response to an access request for the first page data. It can be understood that the cursor here is used to mark the paging position in order to facilitate paging feedback to the user for all the complete set of segment results.

In 615, the storage module 404 sends the first page result set and the first cursor to the access module 401. It can be understood that the access module 401 stores each cursor in real time in order to accurately respond to each next page query request of the user.

In 616, the access module 401 feeds back the first page result set, stores the first cursor, and detects the next page query request sent by the user to request the next page segment result set.

In 617, the access module 401 sends a first cursor and a next page query request to the Proxy 402 to complete query processing for the segment result set of the next page based on the first cursor.

In 618, the Proxy 402 generates an access request to the second paging data according to the segment list and the pagination request.

In 619, the Proxy 402 sends an access request for the second paging data to the storage module 404.

In 620, the storage module 404 determines a second page result set from all segment query result sets and determines a second cursor based on the second page result set in response to an access request for the second page data.

In 621, the storage module 404 sends the second page result set and the second cursor to the access module 401.

In 622, the access module 401 feeds back the second page result set and stores the second cursor. It can be understood that the above steps 618 to 622 may be referred to the above steps 612 to 614, for additional details.

It can be understood that by the data pagination method illustrated in the above steps 601 to 622, the SDK initiates a request for obtaining data in bulk based on the user request, the Proxy detects that the result set of the request is not cached on S3, forwards the request sent by the SDK to the Shard Leader, the Query Node uploads all result sets to S3, and returns a success message. The Proxy initiates an access to the S3 data and returns a first batch of data results to the terminal 100 to form a first page and returns a cursor that will be requested next time. The SDK access module continues to request the next batch of data with the cursor returned from the last result to form a second page. Therefore, in the case where the memory of the vector database according to the embodiment of the present disclosure cannot perform the aggregation processing on the query result, the pagination of the mass data is realized, and the validity and stability of the pagination are ensured.

Embodiments of the present disclosure further provide an electronic device including a memory for storing instructions for execution by one or more processors of the electronic device, and a processor that is one of the one or more processors of the electronic device for performing the above construction method.

Figure 7:
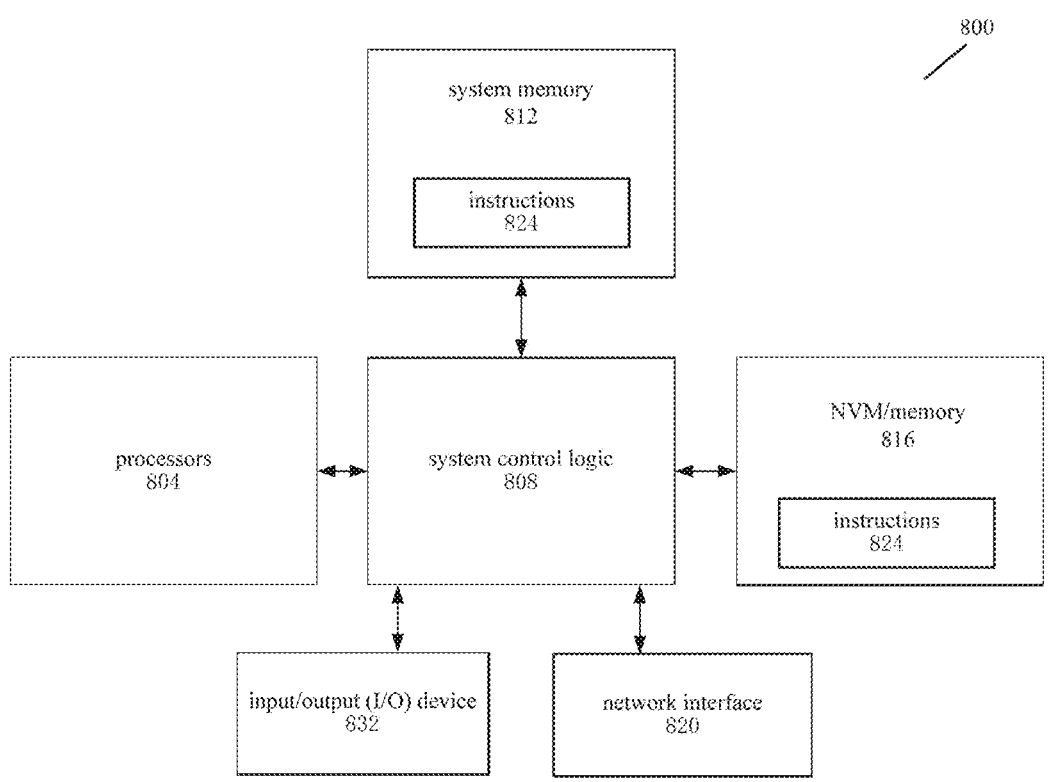
FIG. 7 shows a block diagram of an electronic device according to embodiments of the present disclosure.

FIG. 7 shows a block diagram of an electronic device according to embodiments of the present disclosure. The electronic device 800 may include one or more processors 804. A system control logic 808 can be coupled to at least one of processors 804. A system memory 812 can be coupled to system control logic 808. A non-volatile memory (NVM) 816 can be coupled to system control logic 808. A network interface 820 can be coupled to system control logic 808.

In embodiments, the processor 804 can include one or more single-core or multi-core processors. In embodiments, the processor 804 can include any combination of a general-purpose processor and a special purpose processor (e.g., a graphics processor, a disclosure processor, a baseband processor, etc.). In embodiments in which the electronic device 800 employs an eNB (Evolved Node B) 101 or an RAN (Radio Access Network) controller 102, the processor 804 can be configured to perform various compliant embodiments.

In embodiments, the system control logic 808 can include any suitable interface controller to provide any suitable interface to at least one of the processors 804 and/or any suitable device or component in communication with the system control logic 808.

In embodiments, the system control logic 808 can include one or more memory controllers to provide an interface to system memory 812. The system memory 812 can be used to load and store data and/or instructions. The memory 812 of the electronic device 800 can include any suitable volatile memory, such as a suitable dynamic random-access memory (DRAM), in some embodiments.

The NVM/memory 816 can include one or more tangible, non-transitory computer-readable media for storing data and/or instructions. In embodiments, the NVM/memory 816 can include any suitable non-volatile memory such as flash memory and/or any suitable non-volatile storage device, such as at least one of an HDD (Hard Disk Drive), a CD (Compact Disc) drive, a DVD (Digital Versatile Disc) drive. The NVM/memory 816 can include a portion of storage resources on the device on which the electronic device 800 is installed, or it can be accessed by, but not necessarily part of, the device. For example, NVM/storage 816 can be accessed over a network via network interface 820.

The system memory 812 and NVM/memory 816 can include temporary and permanent copies of instructions 824, respectively. The instructions 824 can include instructions that, when executed by at least one of the processors 804, cause the electronic device 800 to implement the construction method described above. In embodiments, the instructions 824, hardware, firmware, and/or software components thereof can additionally/alternatively be disposed in system control logic 808, network interface 820, and/or processor 804.

The network interface 820 can include a transceiver for providing a radio interface for electronic device 800 to communicate with any other suitable device (e.g., front-end module, antenna, etc.) over one or more networks. In embodiments, the network interface 820 can be integrated with other components of electronic device 800. For example, the network interface 820 may be integrated with at least one of the system memory 812, the NVM/memory 816, and a firmware device (not shown) having instructions that, when executed by at least one of the processors 804, the electronic device 800 implements the above-described construction method.

The network interface 820 can further include any suitable hardware and/or firmware to provide a multiple-input multiple-output radio interface. For example, network interface 820 can be a network adapter, a wireless network adapter, a telephone modem, and/or a wireless modem.

In one embodiment, at least one of the processors 804 can be packaged together with logic for one or more controllers of the system control logic 808 to form a SiP. In one embodiment, at least one of the processors 804 can be integrated on the same die as logic for one or more controllers of the system control logic 808 to form a system-on-chip (SoC).

The electronic device 800 can further include an input/output (I/O) device 832. I/O device 832 may include a user interface to enable a user to interact with electronic device 800; the peripheral component interface is designed so that the peripheral component can also interact with the electronic device 800. In embodiments, the electronic device 800 further includes a sensor for determining at least one of environmental conditions and location information associated with the electronic device 800.

In some embodiments, the user interface can include, but is not limited to, a display (e.g., a liquid crystal display, a touch screen display, etc.), a speaker, a microphone, one or more cameras (e.g., still image cameras and/or cameras), a flashlight (e.g., a light emitting diode flash), and a keyboard. In some embodiments, peripheral component interfaces may include, but are not limited to, non-volatile memory ports, audio jacks, and power interfaces. In some embodiments, the sensors may include, but are not limited to, gyroscope sensors, accelerometers, proximity sensors, ambient light sensors, and positioning units. The positioning unit may also be part of or interact with the network interface 820 to communicate with components of the positioning network (e.g., a Global Positioning System (GPS) satellite).

The embodiments disclosed herein may be implemented in hardware, software, firmware, or a combination of these implementations. Embodiments of the present disclosure may be implemented as a computer program or program code executing on a programmable system including at least one processor, a storage system (including volatile and non-volatile memory and/or storage elements), at least one input device, and at least one output device.

Program code may be applied to the input instructions to perform the functions described herein and to generate output information. The output information may be applied to one or more output devices in a known manner. For purposes of the present disclosure, a processing system includes any system having a processor such as, for example, a digital signal processor (DSP), a microcontroller, a disclosure specific integrated circuit (ASIC), or a microprocessor. The program code may be implemented in a high-level programming language or an object-oriented programming language to communicate with the processing system. The program code may also be implemented in assembly language or machine language, if desired. Indeed, the mechanisms described herein are not limited in scope to any particular programming language. In either case, the language may be a compilation language or an interpretation language.

In some cases, the disclosed embodiments may be implemented in hardware, firmware, software, or any combination thereof. The disclosed embodiments may also be implemented as instructions carried by or stored on one or more temporary or non-temporary machine-readable (e.g., computer-readable) storage media, which may be read and executed by one or more processors. For example, the instructions may be distributed through a network or through other computer-readable media. Thus, a machine-readable medium may include any mechanism for storing or transmitting information in a form readable by a machine (e.g., a computer), including, but not limited to, a floppy disk, an optical disk, an optical disk, a read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the drawings, some structural or methodological features may be shown in a particular arrangement and/or sequence. However, it should be understood that such a particular arrangement and/or ordering may not be required. Rather, in some embodiments, these features may be arranged in a manner and/or sequence different from that shown in the illustrative drawings. In addition, the inclusion of structural or methodical features in a particular figure is not meant to imply that such features are required in all embodiments, and that such features may not be included or may be combined with other features in some embodiments.

It should be noted that each unit/module mentioned in each device embodiment of the present disclosure is a logical unit/module. Physically, a logical unit/module may be a physical unit/module, may be a part of a physical unit/module, or may be implemented in a combination of a plurality of physical units/modules. The physical implementation of these logical units/modules is not most important. The combination of functions implemented by these logical units/modules is the key to solving the technical problem proposed in the present disclosure. Furthermore, in order to highlight the inventive part of the present disclosure, the above-mentioned device embodiments of the present disclosure do not introduce units/modules which are not closely related to solving the technical problems set forth in the present disclosure, which does not indicate that the above-mentioned device embodiments do not have other units/modules.

It is to be noted that in the embodiments and description of the present disclosure, relational terms such as first and second etc. are used solely to distinguish one entity or operation from another entity or operation, and do not necessarily require or imply any such actual relationship or order between such entities or operations. Moreover, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement "comprising one"; does not rule out there are additional identical elements in the process, method, article, or apparatus that includes the element.

While the present disclosure has been illustrated and described with reference to certain preferred embodiments thereof, it will be understood by those of ordinary skill in the art that various changes may be made in form and detail without departing from the scope of the present disclosure.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which can be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that can include: A alone; A and B; A, B and C; A, B, C, and D; and so forth. The bounds of an "and/or" list are defined by the complete set of combinations and permutations for the list.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as disclosed above.

The invention claimed is:

1. An apparatus comprising:
a memory for storing database data; and
a processor configured to perform the following processes, including:
  acquiring a pagination request from a user;
  determining a query parameter based on the pagination request;
  determining a corresponding pagination pattern and a requested data amount based on the query parameter;
  determining a target query mode based on the requested data amount;
  generating a query task;
  obtaining at least one first query result based on the query task;
  determining a target result set based on the at least one first query result;
  paging the target result set based on the pagination pattern and the target query mode to obtain multiple pages of pagination data; and
  wherein, when the target query mode comprises a first query mode, the generating the query task comprises:
    determining the first query mode;
    selecting a target paging parameter and a target sorting parameter based on the pagination pattern and the first query mode;
    loading database data based on the target paging parameter and the target sorting parameter;
    determining the database data that was loaded; and
    generating a query task according to the target paging parameter and the target sorting parameter.

2. The apparatus according to claim 1, wherein:
when the target query mode comprises a second query mode, the determining a target query mode based on the requested data amount, comprises:
  when the amount of requested data is less than or equal to a preset threshold, the first query mode is set as the target query mode, wherein the first query mode is used to indicate an immediate pagination, and
  when the amount of requested data is greater than a preset threshold, the second query mode is set as the target query mode, wherein the second query mode is used to indicate a pagination of bulk data.

3. The apparatus according to claim 1, wherein obtaining the at least one first query result based on the query task comprises:
  determining a second level query task based on a first level query task, wherein the first level query task runs on a first level node and the second level query task runs on a second level node;
  determining a third level query task based on the second level query task, wherein the third level query task runs on a third level node, and the third level node including a segmented node; and
  executing the third level query task to obtain the at least one first query result.

4. The apparatus according to claim 3, wherein determining the target result set based on the at least one first query result comprises:
  performing a first aggregation process on the at least one first query result to obtain at least one second query result, wherein the first aggregation process runs on the second level node; and
  performing a second aggregation process on the at least one second query result to obtain the target result set, wherein the second aggregation process runs on the first level node.

5. The apparatus according to claim 2, wherein the target paging parameter includes an offset value and a limit value, and
paging the target result set based on the pagination pattern and the first query mode to obtain multiple pages of pagination data comprises one or more of:
  based on the pagination pattern, discarding the data with the number specified by the pagination offset value in the front of the target result set, and taking the data with the number specified by the pagination limit value in the in the front of the remaining data to obtain the multiple pages of pagination data;
  based on the pagination pattern, discarding data with the number specified by the pagination offset value in the front of the target result set, and taking the data with the number specified by the pagination limit value in the in the front of the remaining data as the multiple pages of pagination data, wherein the target result set is obtained by aggregating the first query results sorted according to distance;
  based on the pagination pattern, discarding data with the number specified by the pagination offset value in the front of the target result set, and taking the data with the number specified by the pagination limit value in the in the front of the remaining data to obtain the multiple pages of pagination data, wherein the target result set is obtained by aggregating the first query results ordered by rowID or the primary key; and
  based on the pagination pattern, determining a target cursor from a preset cursor set, and paging the target result set according to the target cursor.

6. The apparatus according to claim 2, wherein generating a query task based on the pagination pattern and a target query mode comprises:
  determining the second query mode, and then generating a query task based on the pagination pattern and the second query mode.

7. The apparatus according to claim 6, wherein:
the first query result comprises a segmented query result set; and
obtaining the at least one first query result based on the query task comprises:
  determining a second level query task based on the first level query task, wherein the first level query task runs on a first level node and the second level query task runs on a second level node,
  determining a third level query task based on the second level query task, wherein the third level query task runs on a third level node, the third level node including a segmented node, and executing the third level query task to obtain a segmented query result set corresponding to each segment.

8. The apparatus according to claim 7, wherein determining the target result set based on the at least one first query result comprises:
caching the segmented query result set as the target result set in a designated storage location based on the corresponding segment of each segment, wherein the designated storage location includes S3 caching.

9. The apparatus according to claim 8, wherein paging the target result set based on the pagination pattern and the target query mode to obtain multiple pages of pagination data comprises:
establishing a segment list based on a segmented query result set corresponding to each segment;
determining an accessed target segment from the segment list according to the pagination pattern;
using a segmented query result set corresponding to the target segment as the target page query data;
storing the target page query data and a target cursor which is corresponding to the next page query data; and
determining accessed next page query data based on the target cursor.

10. A method performed by at least one processor, comprising:
acquiring a pagination request from a user;
determining a query parameter based on the pagination request;
determining a corresponding pagination pattern and a requested data amount based on the query parameter;
determining a target query mode based on the requested data amount;
generating a query task;
obtaining at least one first query result based on the query task;
determining a target result set based on the at least one first query result;
paging the target result set based on the pagination pattern and the target query mode to obtain multiple pages of pagination data; and
wherein, when the target query mode comprises a first query mode, the generating the query task comprises:
determining the first query mode;
selecting a target paging parameter and a target sorting parameter based on the pagination pattern and the first query mode;
loading database data based on the target paging parameter and the target sorting parameter;
determining the database data that was loaded; and
generating a query task according to the target paging parameter and the target sorting parameter.

11. A non-transitory computer-readable storage medium having stored thereon instructions that, when executed on an electronic device, cause the electronic device to perform a method comprising:
acquiring a pagination request from a user;
determining a query parameter based on the pagination request;
determining a corresponding pagination pattern and a requested data amount based on the query parameter;
determining a target query mode based on the requested data amount;
generating a query task;
obtaining at least one first query result based on the query task;
determining a target result set based on the at least one first query result;
paging the target result set based on the pagination pattern and the target query mode to obtain multiple pages of pagination data; and
wherein, when the target query mode comprises a first query mode, the generating the query task comprises:
determining the first query mode;
selecting a target paging parameter and a target sorting parameter based on the pagination pattern and the first query mode;
loading database data based on the target paging parameter and the target sorting parameter;
determining the database data that was loaded; and
generating a query task according to the target paging parameter and the target sorting parameter.

12. The non-transitory computer-readable storage medium according to claim 11, wherein:
when the target query mode comprises a second query mode,
the determining a target query mode based on the requested data amount, comprises:
when the amount of requested data is less than or equal to a preset threshold, the first query mode is set as the target query mode, wherein the first query mode is used to indicate an immediate pagination, and
when the amount of requested data is greater than a preset threshold, the second query mode is set as the target query mode, wherein the second query mode is used to indicate a pagination of bulk data.

13. The non-transitory computer-readable storage medium according to claim 12, wherein obtaining the at least one first query result based on the query task comprises:
determining a second level query task based on a first level query task, wherein the first level query task runs on a first level node and the second level query task runs on a second level node;
determining a third level query task based on the second level query task, wherein the third level query task runs on a third level node, and the third level node including a segmented node; and
executing the third level query task to obtain at least one first query result.

14. The non-transitory computer-readable storage medium according to claim 12, wherein determining the target result set based on the at least one first query result comprises:
performing a first aggregation process on the at least one first query result to obtain at least one second query result, wherein the first aggregation process runs on the second level node; and
performing a second aggregation process on the at least one second query result to obtain the target result set, wherein the second aggregation process runs on the first level node.

15. The non-transitory computer-readable storage medium according to claim 12, wherein the target paging parameter includes an offset value and a limit value, and paging the target result set based on the pagination pattern and the target query mode to obtain multiple pages of pagination data comprises one or more of:
paging the target result set based on the pagination pattern and the first query mode to obtain multiple pages of pagination data comprises one or more of:
based on the pagination pattern, discarding the data with the number specified by the pagination offset value in the front of the target result set, and taking the data with the number specified by the pagination limit value in the in the front of the remaining data to obtain the multiple pages of pagination data;

based on the pagination pattern, discarding data with the number specified by the pagination offset value in the front of the target result set, and taking the data with the number specified by the pagination limit value in the in the front of the remaining data as the multiple pages of pagination data, wherein the target result set is obtained by aggregating the first query results sorted according to distance;

based on the pagination pattern, discarding data with the number specified by the pagination offset value in the front of the target result set, and taking the data with the number specified by the pagination limit value in the in the front of the remaining data to obtain the multiple pages of pagination data, wherein the target result set is obtained by aggregating the first query results ordered by rowID or the primary key; and based on the pagination pattern, determining a target cursor from a preset cursor set, and paging the target result set according to the target cursor.

16. The non-transitory computer-readable storage medium according to claim 12, wherein:

the first query result comprises a segmented query result set; and obtaining the at least one first query result based on the query task comprises:

determining a second level query task based on the first level query task, wherein the first level query task runs on a first level node and the second level query task runs on a second level node, determining a third level query task based on the second level query task, wherein the third level query task runs on a third level node, the third level node including a segmented node, and executing the third level query task to obtain a segmented query result set corresponding to each segment.

17. The non-transitory computer-readable storage medium according to claim 14, wherein determining the target result set based on the at least one first query result, and paging the target result set based on the pagination pattern and the target query mode to obtain multiple pages of pagination data, comprise:

caching the segmented query result set as the target result set in a designated storage location based on the corresponding segment of each segment, wherein the designated storage location includes S3 caching;

establishing a segment list based on a segmented query result set corresponding to each segment;

determining an accessed target segment from the segment list according to the pagination pattern;

using a segmented query result set corresponding to the target segment as the target page query data;

storing the target page query data and a target cursor which is corresponding to the next page query data; and determining accessed next page query data based on the target cursor.

* * * * *